Jan. 1, 1957  H. S. PAYNE  2,776,363
ARC WELDING PROCESS AND APPARATUS FOR USE THEREIN
Filed Oct. 24, 1950  6 Sheets-Sheet 1

INVENTOR.
HAROLD SPENCER PAYNE
BY
Oberlin & Limbach
ATTORNEYS.

INVENTOR.
HAROLD SPENCER PAYNE
BY
Oberlin & Limbach
ATTORNEYS.

INVENTOR.
HAROLD SPENCER PAYNE
BY
Oberlin + Limbach
ATTORNEYS.

United States Patent Office 2,776,363
Patented Jan. 1, 1957

2,776,363

ARC WELDING PROCESS AND APPARATUS FOR USE THEREIN

Harold Spencer Payne, Cleveland, Ohio, assignor to The Lincoln Electric Company, Cleveland, Ohio, a corporation of Ohio Application October 24, 1950, Serial No. 191,880

19 Claims. (Cl. 219—124)

The present improvements, relating as indicated to arc welding, have more particular regard to methods of arc welding in which a metallic electrode or weld rod of indefinite length is employed, such rod being continuously fed to the arc as the end thereof is melted off incidentally to the welding operation.

More particularly, the present invention constitutes an improvement in the method of high speed arc welding taught by U. S. Patent No. 2,444,834 to George G. Landis and Norman J. Hoenie, dated July 6, 1948. The significant feature of such patented method is the use in an arc welding operation of the general character described above of an arc welding current of sufficiently high density to produce more heat by the resistance heating of the terminal portion of the metallic electrode or weld rod than is absorbed by such portion from the arc at such electrode end. In the process as described in said patent it was considered necessary, or at least desirable, to employ a current having a current density in excess of 60,000 amperes per square inch of normal electrode cross-section. As further pointed out, and in the actual commercial practice of the high speed arc welding method of the patent, such condition as to current density is obtained by imposing a current having a relatively high amperage, compared with the current normally used in an arc welding operation, on a weld rod or wire of comparatively small diameter to that normally used in such operation. It is well known of course that the voltage range within which a welding arc may be maintained is not only relatively low but is also quite definitely limited, i. e. will usually lie between 20 volts and 45 volts. On the other hand, by increasing the current density, the resistance heating of the terminal portion (sometimes referred to as the "stick-out") becomes a consequential factor in the melting down of such portion, while at the same time the intense heat developed by the arc is utilized to interfuse the electrode metal with that of the work-piece.

The desirability of utilizing such resistance heating, not recognized previously to the discovery on which the aforesaid patent is based, is in large part due to the fact that resistance heating increases as the square of the current and not in direct proportion thereto, as in the case of heating at the arcing end of the electrode. As a result of thus utilizing such resistance heating as a factor it has been found possible greatly to increase the melt-off rate of the weld rod or wire, i. e. the rate at which the end thereof is melted down and interfused with the part or parts to be welded. Thus, as stated in said patent, and now realized in extensive commercial practice, it is possible to obtain a wire melt-off of as much as 0.45 lb. per minute with $\frac{3}{64}$ inch diameter electrode and thereby correspondingly increase the speed at which any given welding operation may be carried out.

While the aforesaid method of high speed arc welding has gone into extensive commercial use, I have discovered that substantial improvement can be made in the operation thereof, particularly in the welding of lighter gauge plates or sheets and in case of poor fit up between the plate edges. Thus, because of the high current density utilized, there is a tendency to built up the bead produced by the welding operation along the edges thereof so as to produce a more pronounced or abrupt ledge than in the case of the customary bead, and even, on occasion, a tendency to undercut such bead. This may be found objectionable from the standpoint of appearance even where a perfectly sound weld is obtained. Also in welding thin plates or sheets, unless the rate of feed of the weld rod or wire is properly determined, there is a tendency for the end thereof to be projected entirely through the welding area. This may also occur when the edges of the plates being welded do not closely abut.

Accordingly, one general object of the present invention is to provide means whereby in an arc welding operation the depth of penetration, the kind of seam and contour of the bead can be controlled as desired. A further object is to render the welding operation substantially automatic, while still retaining certain desirable features of manual operation.

Accordingly, in addition to providing an improved work-engaging, self-propelled carriage for the arc-welding tool, provision is made for oscillating the end of the electrode (weld rod or wire) transversely of the line to be welded as it is moved along such line. Such oscillation may be either straight line or variously curved line in relation to the direction of travel of the electrode. By proper correlation of the rate of such transverse oscillation with the rate of travel along such line, the depth of penetration of the resulting weld may be reduced or controlled as desired. At the same time the body of metal resulting from the interfusion of the weld rod or wire with the adjacent portions of the work-piece may be widened to such extent, within reason, as may be found desirable, and the bead, i. e. the portion of such interfused weld metal as rises above the surface of the welded joint, will be correspondingly flattened out, and variously contoured in cross-section, as may be desired. Not only is a bead of more pleasing appearance thus obtained, but the above noted tendency to undercut is eliminated.

To the accomplishment of the foregoing and related ends, said invention, then, consists of the means hereinafter fully described and particularly pointed out in the claims, the annexed drawings and the following description setting forth in detail certain means and one mode of carrying out the invention, such disclosed means and mode illustrating, however, but one of various ways in which the principle of the invention may be used.

Figure 18:
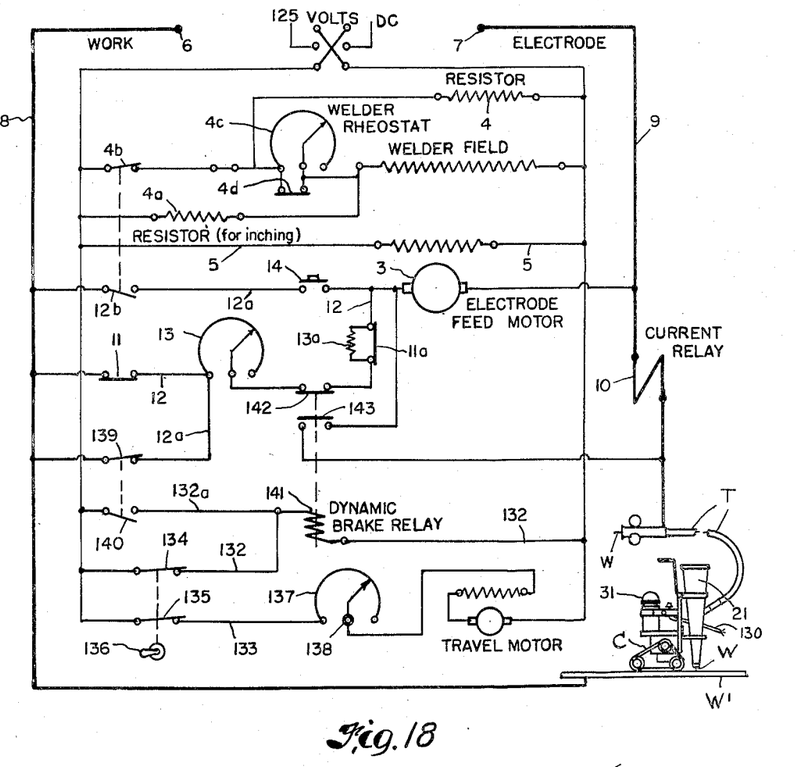
Fig. 18 is a schematic diagram of the welding system as a whole.

The arc welding system, which is employed in the present improved apparatus and process, as shown by the wiring diagram, Fig. 18, is substantially the same as that of the aforesaid Patent No. 2,444,834, but includes a number of additional circuits and other features. Some of these will now be pointed out, reference being at the same time made to the apparatus illustrated in Figs. 1 to 8, inclusive, but the system as a whole will be described later.

As before, such apparatus is primarily designed for use in feeding weld rod or wire of relatively small diameter, e. g. 1/16 to 5/64 inch, and at comparatively high rates of feed, e. g. approximately 690 inches per minute for such 1/16 inch D. wire and only slightly less for the 5/64 inch D. wire. Such wire W is thus fed to the work-piece W' by means of conventional gripping rolls (not shown) driven by motor 3 through a reduction or change speed gear box (not shown), whereby the rate of feed may be set, as indicated, for each of the several sizes or diameters of wire with which the apparatus is designed to be employed, and to meet other conditions of use. Furthermore, the current employed will be of such value in relation to the cross-sectional area of the weld rod or wire as to be effective substantially instantaneously to melt off the end of the weld thereof whenever such end comes in contact with the work-piece and establish an arc without danger of "freezing."

Current is supplied to the field of motor 3 through leads 5 from a source of current independent of the welding curernt, e. g. from an ordinary 125 v. power line. The welding current may likewise be taken from any suitable source, e. g. from the terminals 6 and 7 of a welding machine, which may be provided with the usual means for varying the voltage and amperage of the current, as may be found desirable for any particular operation. Only one such means, whereby the amperage of the welding current may be varied, will be here noted.

It is not contemplated or necessary that changes in the setting of such machine, or in other words, of the welding current, will be required during the welding operation, or in fact for any given set-up, i. e. any operation in which it has been determined at what rate the weld rod or wire is to be fed to the work and the current appropriate for the particular operation has been selected. However, as shown on the schematic diagram, Fig. 18, in addition to a resistor 4 connected across the welder field in order to keep the voltage in the corresponding highly inductive circuit at a safe value, the flow of current through such field is through a resistor 4a, so that when field switch 4b is open a voltage on the order of 12 to 14 volts, instead of a residual voltage of 4 to 6 volts, will exist between lines 8 and 9. Upon closing said switch 4b, current for the welder field will be initially supplied through rheostat 4c, whereby the current for such field, and thus the welding current supplied by the welder, is reduced substantially below normal. A switch 4d is provided which is operated by a current relay 10 to cut out this rheostat immediately after the flow of welding current begins. In this way it is possible to strike the arc with current of reduced density, following which the current of full density will be automatically supplied to terminals 6 and 7.

One of the two adjacent terminals 6 and 7 is connected by means of a lead 8 with the work-piece W', while the other terminal is connected by means of a lead 9 with a conductor 17 which forms part of a flexible tubular guide T, only a portion of which is shown in detail (see Fig. 1), it being through such guide that the electrode in the form of wire W is continuously fed to the point where the arc welding operation is carried out. The electrode terminal may be either negative or positive, as found desirable, the melt-off rate being higher when the electrode is negative.

Operation of the electric feed motor 3 is tied in with the welding operation by current relay 10, which is connected in series in the electrode lead 9 so as to be operated by the flow of welding current to close a normally open switch 11 in one of the armature leads 12. An adjustable rheostat 13 is also conveniently included in this lead. In addition to the relay controlled switch 11, there is provided in armature lead 12, a second switch 11a, controlled likewise by current relay 10, to cut out a fixed resistor 13a, which serves to reduce the initial flow of current in starting motor 3. There is also provided, in a parallel connection 12a to the armature, a push-button switch 14, which is used to operate the motor to feed the wire when not welding, for example in initially threading the wire through the tubular guide T.

It will be noted that the push-button controlled circuit 12a is also controlled by a switch 12b that is interconnected with the welder field switch 4b, so that when the one such switch is open the other will be closed, and vice versa. Furthermore, when the field switch 4b is open and switch 12b closed enough current will flow through circuit 12a upon depressing the push-button switch 14 to operate motor 3 to feed the electrode down to the work.

The flexible tubular guide T is preferably, although not necessarily, composed of sections capable of being coupled together to provide a guide of any desired length. However the construction thereof forms no part of the present invention, it being sufficient to note that, as shown in the partial illustration thereof found in Fig. 1, it comprises a main guide element or liner 16 in the form of a coil of hardened steel wire or equivalent wear resisting material, through which the weld rod or wire directly passes when fed to the work. Surrounding such inner tube is a conductor sheath 17 formed of multistranded copper wire assembled and twisted about said inner tube much as are the component strands in a wire cable, such conductor being in turn surrounded with a heavy sheath 18 of rubber or equivalent flexible insulating material. When the apparatus is assembled for use, said conductor 17 forms in effect a continuation of lead 9. The end of the tube, constructed as thus described, is shown as entering an externally insulated tubular coupling member 19 to which the adjacent end of the conductor member 17 is electrically connected as by brazing.

Figures 1, 5, 8, 11:
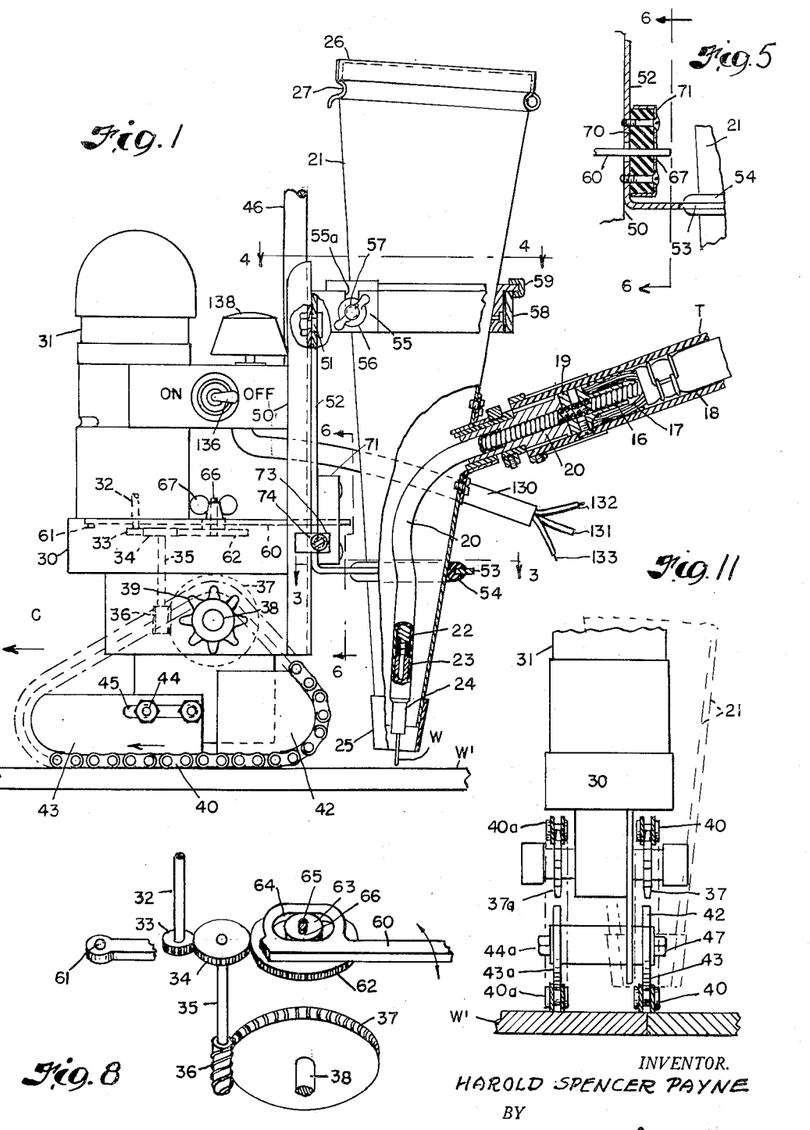
Fig. 1 is a side elevation of one illustrative form of apparatus suitable for carrying out the present improved process of arc welding, certain portions of such apparatus being broken away and shown in section.
Figs. 5 and 6 are vertical sections taken on the lines 5—5 and 6—6, respectively, on Fig. 3.
Fig. 8 is a diagram, in perspective, of the drive mechanism that forms one feature of the apparatus.
Fig. 11 is an end elevation, similar to that of Fig. 2, but showing a modification in the traction means employed.

While coupling member 19 may be used to connect the end of one section of guide tube T with a complementary end of another section, in Fig. 1 such member is shown connected with a terminal fitting 20 which forms the welding tool, such fitting having associated therewith a flux hopper 21. The fitting or tool 20 comprises a core 22 that is in effect an extension of the liner 16 of guide tube T. It is held in the particular curved form shown by a surrounding tube 23 and is fitted at its outer or lower end with a straight nozzle tip 24.

The above-described relationship of guide tube and flux hopper is generally described in the copending application of George G. Landis and Norman J. Hoenie, Serial No. 123,046, filed October 22, 1949.

The hopper 21 is a light weight receptacle of generally conical form, the upper end of the fitting or tool 20 passing through and being firmly secured to the side wall thereof at a point intermediate of its ends, while the tip 24 which forms the lower end of the fitting or tool is disposed centrally within the opening at the lower end of the receptacle. Removably fitted to the latter is a cone tip 25, which when in place projects slightly beyond the nozzle tip 24, while a lid or cover 26 is hingedly attached to the upper larger end of the receptacle, being provided with a snap catch 27, whereby such cover may be retained in closed position, irrespective of the position of the receptacle.

The remaining apparatus illustrated, with several modifications, in Figs. 1 to 8 inclusive constitutes essentially a work-engaging, self-propelled carriage C whereon the foregoing welding tool with associated flux hopper may be detachably mounted, the combination being generally known as a welding head which, in accordance with the invention, is relatively portable. At the same time such mounting permits oscillatory movement of the tool with the hopper transversely of the path of travel of the carriage, and the motor, wherewith the latter is provided for the purpose of propelling the same, also serves as means for thus oscillating said tool and hopper.

Figures 2, 3, 4, 6, 7:
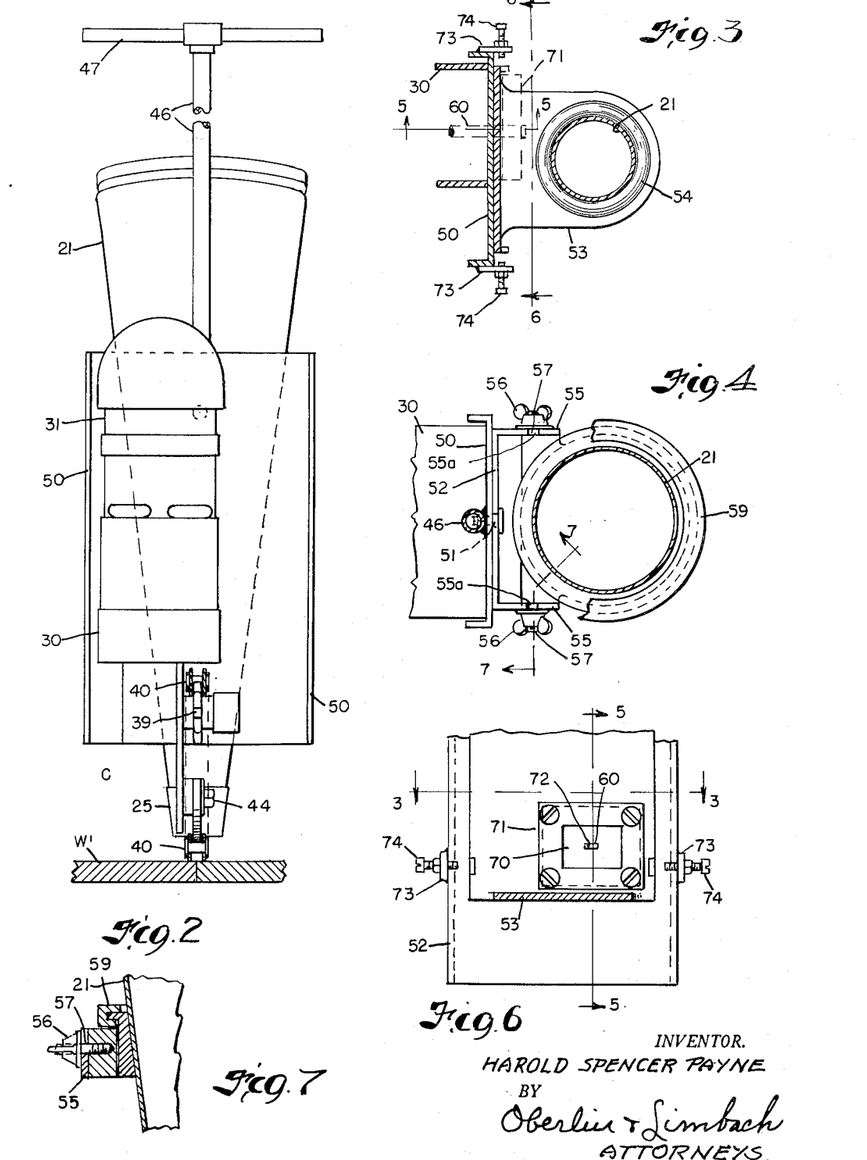
Fig. 2 is an end elevation of such apparatus shown as viewed from the left in Fig. 1.
Figs. 3 and 4 are horizontal sections of portions of the apparatus, the planes of the sections being indicated by the lines 3—3 and 4—4, respectively, in Fig. 1.
Fig. 7 is another vertical section taken on line 7—7, Fig. 4.

The carriage C, in the form illustrated generally in Figs. 1 and 2, comprises a base 30 on which is mounted a motor 31 with its axis or shaft 32 vertically disposed. The lower end of said motor shaft is fitted with a pinion 33 that engages with a gear 34 on a downwardly directed parallel shaft 35 which in turn is fitted with a worm 36 that engages a worm gear 37. The shaft 38 which carries the latter is disposed at right angles to shaft 35 and is fitted with a sprocket 39 that serves as the driving means for a sprocket chain 40 (hereinafter generally referred to as a belt), the latter constituting the work-engaging means whereby the carriage is supported on the work-piece and propelled therealong. The lower horizontal portion of such sprocket chain or belt passes around a fixed guide 42 and an adjustable guide 43 whereby it is kept under proper tension, the chain being wide enough to afford a travelling support for the rest of the mechanism, including the welding tool and hopper when attached thereto.

The adjustable guide 43 is not only adjustable lengthwise of the tread, i. e. work contacting, portion of the belt, but held in selected position by set bolts 44 that pass through a somewhat wider slot 45 in the guide, so that the outer end of the latter may be tilted up or down slightly. In this way such tread portion of the belt may be adapted to have travelling contact with either a convex or curved work surface, such as is frequently encountered, e. g. in welding circumferential seams on a cylindrical tank or boiler.

While the belt 40 will afford a stable support for the device as a whole in the direction in which it is intended to travel, viz. to the left as indicated by the arrow in Fig. 1, such belt in the form there illustrated is not intended to maintain the device upright in a transverse direction. On the contrary, it is designedly capable of being swung in either direction about the line of travel of the tread portion of belt 40. If the size of the apparatus, as a whole, is not too great, it may be maintained in vertical position or thus inclined to one side or the other by the operator directly grasping the flux hopper 21, or other part, as found convenient. In this way the apparatus can be guided in vertical position for butt welding or inclined as required for making a lap or fillet weld.

For the convenience of the operator in manipulating the device, particularly where of large size, a handle may be provided. One satisfactory form of such handle, best shown in Fig. 2, comprises simply a vertical stem 46 with a cross-bar 47 at its upper end. The latter will be at such height above the work-piece on which the device is to travel when welding, so that the operator may stand substantially erect when grasping the bar. In this position, not only can he readily guide the device as required, but he can also observe the welding operation, as it proceeds.

For the purpose of detachably mounting the welding tool 20 with associated flux hopper 21 on the carriage thus provided, the latter is fitted on its forward face with a vertically disposed plate 50 to which is attached by a pivot pin 51, adjacent its upper end, the corresponding end of an L-shaped bracket 52. The lower horizontal portion 53 of the bracket is in the form of an annulus to which is fitted a cushion ring 54 that is adapted to receive the lower portion of the conical receptacle that constitutes the hopper 21 and support the same with the cone nozzle 25 at a predetermined height above the face of the work-piece W' when the apparatus as a whole is supported on the latter by means of the carriage C.

The hopper is further attached to the bracket 52 by means of two arms 55 (see Fig. 4), which are detachably secured to the upper end of the latter by wing nuts 56. The latter engage studs 57 that project oppositely from a ring 58 rotatably secured to the receptacle by a surrounding annular channel 59. Slots 55a in arms 55 permit the ring 58, together with the receptacle to which it is thus attached, to be lifted upwardly, clear of said arms, when the nuts 56 are loosened. By continuing such lifting movement the lower end of the receptacle is released from the cushion ring 54. Furthermore, as a result of the construction first described, the receptacle, when in place on the bracket, is capable of rotation within limits about its central, vertical axis. The utility of this will presently appear.

It will be seen that by virtue of its pivotal mounting on plate 50, the bracket 52 is capable of oscillation transversely of the line of travel of the carriage C as the latter is propelled by means of the endless belt 40, whereby the apparatus as a whole is supported, and a corresponding oscillatory movement will of course be imparted to the flux hopper, and the welding tool carried thereby, and thus to the projecting, or arc end of the weld wire W. Furthermore, the guide tube T will be of such length and sufficiently flexible so that not only may the carriage be set to travel along any desired path, but such oscillatory movement will not be restricted. Since, as just explained above, the receptacle is free to rotate about a vertical axis in its mountings on bracket 52, i. e. about an axis substantially at a right angle to the line of travel of the carriage the guide tube can readily follow the carriage, despite change in its angular relation to the latter.

For the purpose of imparting oscillatory movement to the parts in question, the actuating mechanism shown in detail in Figs. 5 and 8 is provided. This mechanism comprises a lever 60 mounted in the base 30 of the carriage so as to be oscillatory in a horizontal plane about a pivot pin 61 adjacent its one end, while its other end projects through openings therefor provided in plate 50 and bracket 52, such openings being large enough to permit the oscillatory movement of the lever, as will be presently described. The same gear 34 that transmits power from the motor to drive the track-engaging means also serves to drive a gear 62 that carries an eccentric 63 working in a slot 64 in said lever 60. It will accordingly be seen that the rate of oscillation of the latter will be directly correlated with the rate of travel of the carriage as it is propelled along the work-piece through the medium of the endless belt 40.

The eccentric 63 is desirably adjustably mounted on the face of gear 62 which carries it, so that the amplitude of oscillation of lever 60 may be changed as desired. To this end, the eccentric may be provided with a slot 65 slidably fitted to a stud 66 on the gear face, a wing nut 67 serving to lock the eccentric in selected transverse position.

Inasmuch as lever 60 oscillates in a horizontal plane whereas bracket 52 is required to oscillate in a vertical plane, a flexible connection is required between the outer end of said lever and the bracket, such connection conveniently taking the form of a pad 70 of compressible rubber, or like material, clamped to the base of the bracket by an open shell 71. The end of the lever 60 being then fitted into an opening 72 in the center of the pad 70, the latter will yield the necessary amount to permit the free oscillatory movements of both the lever and the bracket. At the same time such flexible connection dampens the movements of the parts in question, this effect being further enhanced by the use of the rubber gasket 54 in which the lower end of the hopper 21 seats.

If desired, means may be provided for positively limiting the amplitude of oscillation of the bracket 52 and thus of the welding tool, transversely of the seam being welded. For this purpose, as best shown in Fig. 6, the plate 50 on which the bracket is mounted for transverse oscillation, may be provided on each side of the latter adjacent its lower end with a forwardly projecting ear 73 carrying a set screw 74, the inner end of which is disposed to engage the corresponding edge of the bracket as it is alternately swung in opposite directions by the action of the oscillatory lever 60. These set screws may, if desired, be adjusted so as to stop such oscillatory movement short of the full swing which would otherwise be imparted to the bracket by such lever, inasmuch as the compressible pad 70 will permit the end of the lever to continue its movement for a short distance in either direction. The effect of thus stopping the oscillation of the bracket short of the full swing, which would otherwise be imparted by movement of the lever, will be a slight pause in such oscillatory movement at the end of each swing, with a correspondingly slight dwell on the part of the welding tool, or in other words of the arc, at the respective edges of the seam as it is being formed. As will be presently pointed out, such dwell may be desirable in order to obtain certain welding effects.

While the means thus far described for oscillating the welding tool are designed to swing the latter back and forth in a straight line, the actual movement of the end of the weld wire or electrode will be obviously compounded of such transverse movement with the advancing movement of the tool along the line to be welded, i. e. the actual path described by the end of the wire will be made up of a series of zig-zag, slightly curved movements.

Figures 9, 10, 12, 13, 14:
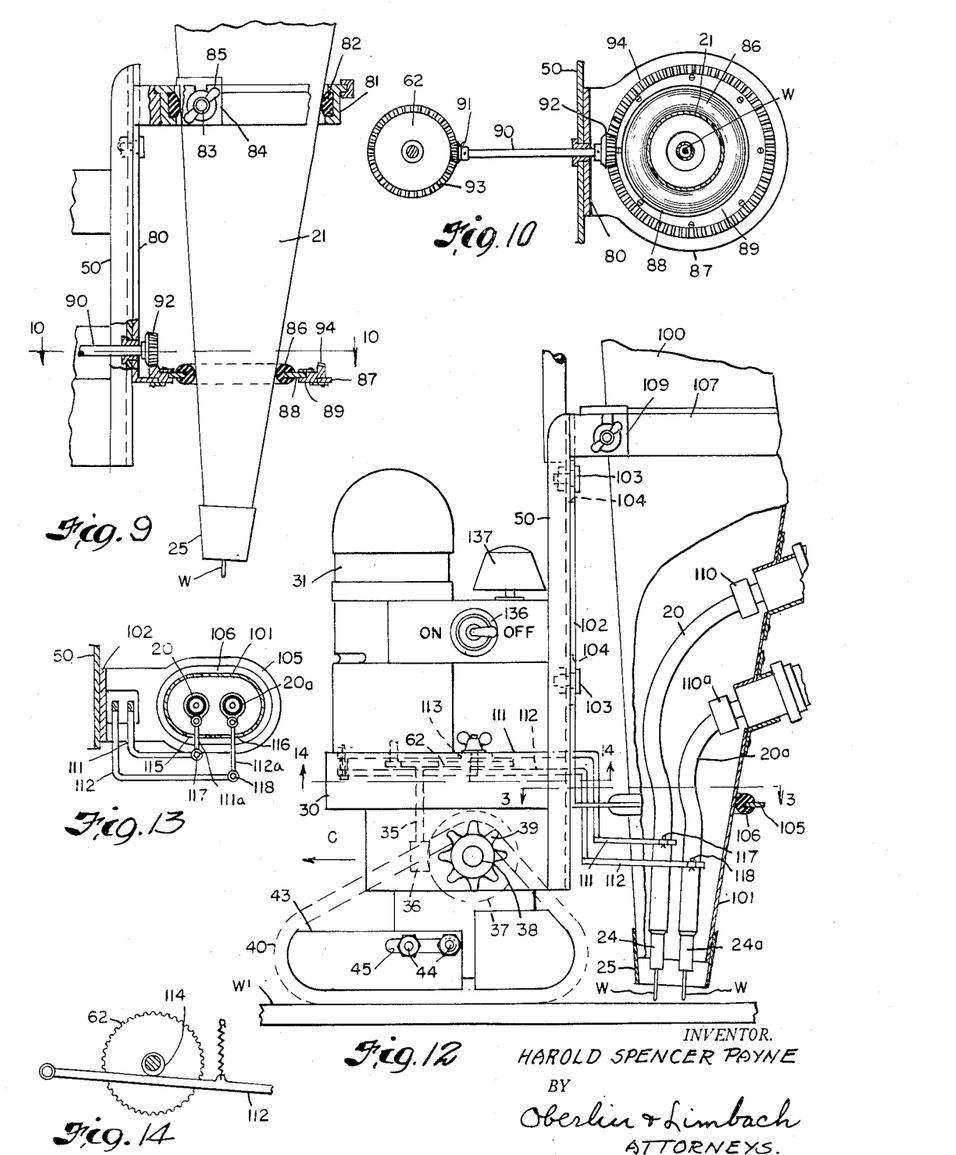
Fig. 9 is a side elevation, similar to that of Fig. 1, but showing a modification in construction.
Fig. 10 is a cross-section of such modified construction, the plane of the section being indicated by the line 10—10 on Fig. 9.
Fig. 12 is a side elevation, similar to that of Fig. 1, but showing a modification, in which, among other changes, a plurality of oscillatory welding tools is provided.
Figs. 13 and 14 are transverse horizontal sections of such modified construction, the planes of the sections being indicated by the lines 13—13 and 14—14, respectively, on Fig. 12.

Instead of providing for such rectilinear, transverse, oscillatory movement, it has been found desirable in certain welding operations to swing the arc back and forth in a definite curved path, including a complete circular path, for which latter purpose the modified means illustrated in Figs. 9 and 10 may be utilized. In this modified construction, the bracket 52 is replaced by a bracket 80, which is of much the same form but is fixedly, instead of swingably, attached to the vertical member 50 of the travelling carriage. The upper portion of the flux receptacle which carries the welding tool and which may, inclusively with the latter, be called a welding "gun," is provided with an encircling carrier ring 81 which has attached to its inner face a rubber gasket 82 having a generally circular face to receive and fit the receptacle at its corresponding diameter. The ring 81, as in the case of ring 52, has oppositely directed studs 83 adapted to be received in slotted arms 84 on the bracket 80 and be clamped thereto by wing nuts 85. However, by reason of the interposition of the gasket 82, it will be seen that the lower end of the receptacle may be, within limits, freely swung in the support thus provided in any direction.

For the purpose of imparting a circular swinging movement to such lower end of the receptacle, and thus to the welding tool, a rubber gasket 86 is provided as before in an annulus 87 that projects forwardly from the lower end of bracket 80, such gasket being of the proper diameter to receive the receptacle at this point. However, in the present construction such gasket is attached to a circular ring 88, that is eccentrically held in a second ring 89, mounted for rotative movement on said annular projection 87. It will thus follow that, when said ring 89 is rotated, the ring 88 and thus the lower end of the receptacle and the weld wire as it emerges therefrom will be caused to travel in a circular path determined by the eccentric offset of ring 88 in ring 89.

Said ring 89 may be conveniently rotated at the desired rate of speed by intergearing the same with the gear 62, just as the previously described lever 60, employed to oscillate the receptacle, was operatively connected with the same gear. The arrangement shown in Figs. 9 and 10 by way of illustration comprises simply a shaft 90 with bevel pinions 91 and 92 on its respective ends, which mesh with corresponding bevel gear teeth 93 and 94 provided on the face of said gear 62 and of ring 89, respectively. It will be understood that the ratio of the gearing thus provided for swinging the lower end of the receptacle and welding tool in a circular path will be such as to thus oscillate the latter, as before, at a selected frequency in relation to the movement thereof along the seam being welded. In other words, just as before, the oscillatory movement is correlated with the rate of travel of the carriage as it is propelled by the supporting belt on the surface of the workpiece.

Just as in the case of the previously described straight oscillatory movement, the actual path followed by the end of the weld-wire, and so of the arc, was a zigzag made up of slightly curved, transverse movements, so here such path will be constituted of a series of successively overlapping, approximately circular paths on the order of a scroll.

The path-pattern thus followed by the weld-wire end, or arc, may obviously be further varied by interposing other kinds of motion translating devices between the drive for the travelling belt, which supports the carriage, and the welding tool, with or without the associated flux receptacle, which is oscillatorily supported on said carriage. Thus by connecting the outer end of oscillatory lever 60 with ring 89, instead of rotating the latter through a complete circle as by means of the gearing described above, such ring may be reversely rotated through a part revolution, with the result that the weld-wire end, or arc, will be moved through a series of connected arcuate paths. Moreover, the latter may be convexly faced in any desired direction, e. g. in the direction of travel of the welding operation or in the opposite direction.

Instead of oscillating the flux hopper and welding tool conjointly as in the previously described construction of apparatus, it is contemplated that such welding tool may be oscillated independently, i. e. with the flux hopper stationarily mounted on the carriage. This modification is illustrated in Figs. 12 to 14, inc., which also illustrate a further modification in that two welding tools are employed. These are preferably arranged in tandem, and so adapted for carrying out the process of electric welding described and claimed in Patent No. 2,320,824 to G. G. Landis et al. dated June 1, 1943. In other words, the arc provided by the more advanced of the two electrodes, or weld wires, will serve preliminarily to join the parts to be welded and the following arc will subject the metal of the resultant juncture to further fusion, all without removal of the melted flux that results from the operation of such first arc.

Referring now to the last cited figures, the construction of the carriage remains substantially the same as in the previously described forms of the apparatus and the corresponding parts thereof are identified by the same reference numerals. In other words, the changes principally relate to the flux hopper and associated welding tools and to the manner in which such hopper is mounted on the carriage.

Such flux hopper 100 is of the same general conical form as previously described hopper 21, except that the lower portion 101 thereof is elongated transversely in the direction in which the apparatus is intended to travel. In other words, the discharge end will be oval instead of circular in cross-section, as shown in Fig. 13. In addition to the terminal fitting 20 which forms the welding tool as previously described, a second such fitting 20a is attached to the side wall of the hopper, preferably immediately below such first fitting, and like it, is arranged to be connected, exteriorly of the hopper, with a second flexible tubular guide (not shown), through which a second weld wire W is fed to such tool, simultaneously with the wire W that is fed through the first tool. The nozzle tip 24a with which such second tool is fitted will be located so as to closely follow the nozzle 24 of the first tool, the distance between the two nozzles being selected to suit the particular welding operation, but being short enough so that the corresponding arcs will operate in effect in a common pool of molten flux.

As previously noted, the flux hopper 100 is designed to be stationarily, instead of oscillatorily, mounted on the carriage. However, as before, it will desirably be removable therefrom. Accordingly the bracket 102, as shown in Fig. 12, is attached to the vertical plate 50 of the carriage by means of two bolts 103 which pass through vertically disposed slots 104 in the bracket, whereby vertical adjustment of the bracket is permitted but no lateral oscillatory movement. The lower projecting portion 105 of the bracket will then be fitted with a rubber gasket 106, just as in the first described form of the apparatus (cf. Fig. 1), and a ring 107 with a rubber gasket adapted to receive the upper portion of the hopper will be detachably secured to arms 109, just as in the modified construction illustrated in Figs. 9 and 10.

In order to permit oscillation of the terminal fittings 20 and 20a, the outer surrounding tubes thereof may be provided with rotatable couplings 110 and 110a, adjacent the points where such fittings enter the side wall of the hopper 100, although, since the required oscillatory movement is of slight amplitude, the fittings, which thus constitute the respective tools, may be made sufficiently flexible to permit such movement and no such coupling therefore be required.

For the purpose of oscillating the lower ends of the fittings, two levers 111 and 112, which correspond generally in location and otherwise with the previously described oscillatory lever 60, may be used. In fact the first such lever will be actuated by an adjustable eccentric 113 on the upper face of gear 62 in precisely the same manner as was said lever 60; while a cam 114 on the reverse, or under side of said gear is utilized to actuate the second such lever (see Fig. 14). The adjustable eccentric 113, which serves to actuate the first of the two levers, may be thus adjusted outwardly from a central position with respect to the axis of gear 62, it being obvious that when it is in such central position no movement will be imparted to the corresponding oscillatory lever, or to the welding tool 20 with which such lever is operatively connected, as will presently be described. While the cam 114, as shown, has no capacity for similar adjustment on the face of the gear, an adjustable eccentric may be substituted therefor, if it is desired to vary the amplitude of oscillation of such second lever and thus of the welding tool nozzle 20a with which it is operatively connected.

Any suitable means may be employed to connect the outer ends of the levers 111 and 112 with the terminal fittings 20 and 20a constituting the welding tools; however, in order that, as previously described, the flux hopper with such associated welding tools may be readily removed from the carriage, the connections in question should be disengageable. Likewise they should not interfere with the free downward flow of flux within the hopper, so that it will be discharged at the proper rate through the nozzle at the lower end of the latter. Accordingly in the illustrative construction shown, the outer ends of such levers are bent downwardly and thence horizontally so as to extend alongside the portion of the hopper which will depend below the gasket ring 106 on bracket 69, wherein such portion is seated. Links 111a and 112a, which extend outwardly from the respective fittings through suitable openings 115 and 116 in the adjacent wall of the hopper, are adapted to be attached at their outer ends to the ends of the levers, respectively, by means of cotter pins 117 and 118, or like removable securing means. It will thus be seen that by simply removing the latter the hopper with the associated welding tools may be removed as a unit from the carriage. As before, when seated in place on the carriage, the hopper will be rotatable about its central vertical axis to accommodate changes in the angle at which the electrode or wire guide-tubes T bear to the line of travel of the apparatus as a whole in following the seam to be welded. In order that the connections between the lower ends of the levers 111 and 112 may adjust themselves to such turning movement of the hopper, a suitable amount of play is provided for between the fastenings and such lever ends.

By appropriately setting the adjustable eccentric 113 on the gear 62 and selecting a cam 114 having the desired throw, it will be seen that the two levers 111 and 112 may be oscillated so as to oscillate in a variety of ways the fittings 20 and 20a of the welding tools with which the outer ends of said lever ends are thus connected. Moreover, in addition to providing for variation in the amplitude of such oscillation in the case of the fitting that is thus oscillated by lever 111, such lever may be held stationary and the corresponding fitting, and thus the weld wire fed therethrough to the work, will be caused to move in a straight line along the seam. On the other hand, both levers, and thus the corresponding welding tool terminals, may be caused to oscillate in unison, either in the same direction or reversely to each other. As a result, a corresponding variety of welding effects may be obtained by the oscillation of one or the other, or both, of the two electrodes or weld wires, where thus arranged in tandem.

It will of course be understood that if found desirable such tandem arrangement may include more than two electrodes or weld wires, the arc ends of which may be thus caused to move variously with respect to the seam being welded. It will likewise be understood that in speaking of the tandem arrangement of such plural electrodes or weld wires it is not intended to imply that the electrodes or weld wires should follow each other along precisely the same line; in other words, the normal path of travel of one may be laterally displaced with respect to that of the other while still obtaining not only all of the advantages of such tandem operation, but of the transverse oscillatory movement now provided for.

Figures 15, 16, 17, 24, 25, 26:
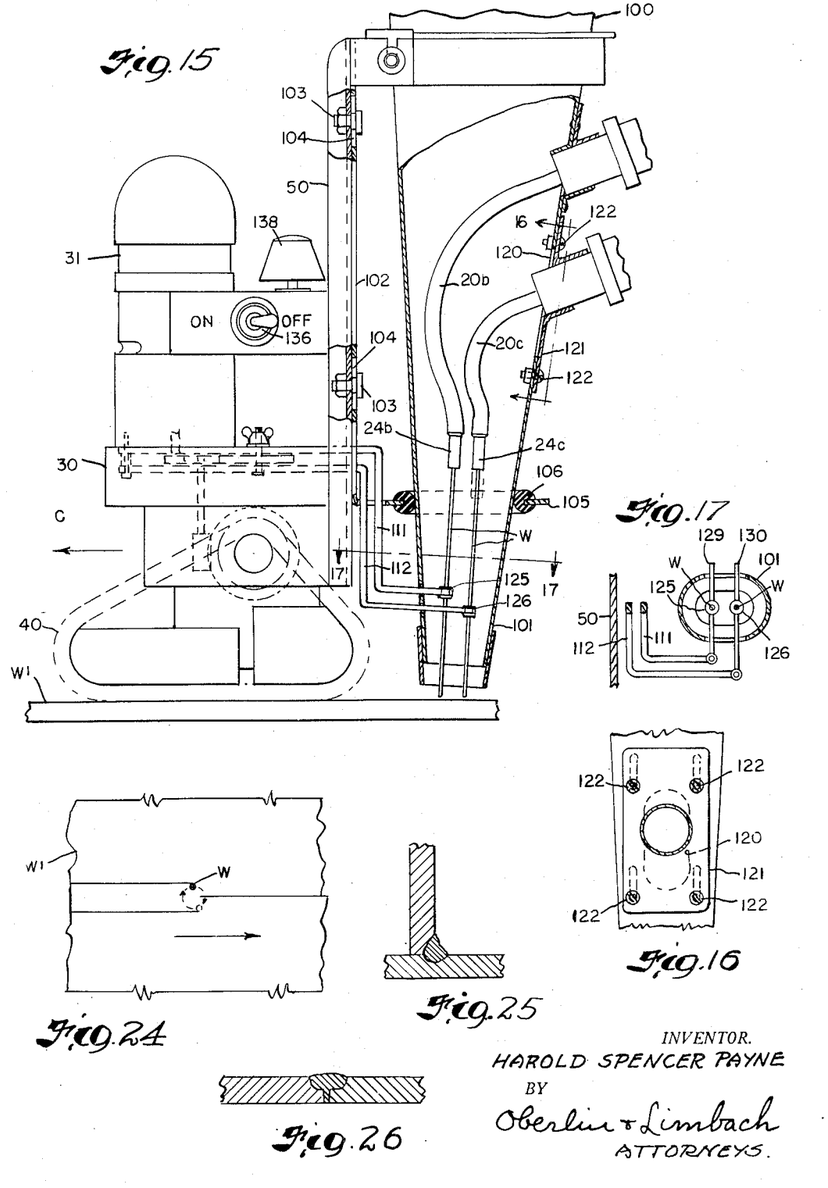
Fig. 15 is a side elevation, similar to that of Figs. 1 and 2, showing a further modification, in that the electrode or weld-wire is oscillated independently of the tool through which it is fed to the work.
Fig. 16 is an end elevation of a detail of such last modification as viewed from the right in Fig. 15.
Fig. 17 is a transverse section of another detail portion thereof, the plane of the section being indicated by line 17—17, on Fig. 15.
Fig. 24 is a diagrammatic plan view similar to that of Fig. 22, but showing the arc oscillating in a circular path.
Fig. 25 is a cross-section of a distinctive form of weld joint obtainable by the use of such circularly oscillating arc.
Fig. 26 is a similar cross-section of a distinctive form of weld joint where plural arcs are employed.

In the further modification illustrated in Figs. 15 to 17 inc., instead of oscillating the welding tool independently of the flux hopper as in the last described construction, or oscillating such tool together with the flux hopper as in the first described construction, provision is made for directly oscillating the electrode or weld wire itself, as it is fed from the welding tool through the lower discharge end of the flux hopper. In other words, in this construction neither the welding tool nor the hopper participates in the desired oscillatory movement.

As shown in the last cited figures, the hopper is of substantially the same design as that in the last previously described modification shown in Figs. 11 to 14 inclusive and it is mounted in substantially the same manner on the carriage C. Thus the lower discharge end of the hopper is elongated in the direction in which the apparatus is designed to travel during the welding operation so as to accommodate two terminal fittings 20b and 20c which are arranged to feed two electrodes or weld wires in tandem fashion to the work. However such welding tools are located higher up within the hopper so that their respective nozzles 24b and 24c will be located at a correspondingly greater height above the work-piece, thus providing for a corresponding greater "stick-out" of the weld wire, i. e. the distance it projects beyond the nozzle, which marks the point where the welding current is supplied thereto, to the arc end of such wire. In other words, whereas in the previously described constructions such "stick-out" is shown as that normally employed in so-called automatic and semi-automatic welding, viz. approximately three-fourths of an inch, in the case in hand it is contemplated such "stick-out" may be as much as four to six inches. The improvement involved in arc welding with a current of high density, where the length of the "stick-out" is thus increased, forms no part of the present invention, but since the portion of the wire which projects beyond the nozzle of the welding tool is quite flexible, because of the small diameter of the wire which will be used, the desired oscillatory movement may be directly imparted thereto without requiring any oscillation either of the corresponding welding tool or of such tool and associated flux hopper. Benefits to be obtained by such increased "stick-outs," at least without the oscillation herein described, are more fully described and claimed in the copending application of George G. Landis and Emmett A. Smith, Serial No. 158,996 filed April 29, 1950, to which reference is made for a fuller description.

Referring, now, to the illustration afforded by Fig. 15, while the two fittings 20b and 20c which constitute the welding tools, are attached to the side wall of the hopper as in the previously described form of the invention, such attachment is made at substantially higher points, inasmuch as the fittings require to be of substantial length in order properly to straighten out the wire and guide the same to the weld line, and, as just pointed out, a greater distance is required to accommodate the increased "stick-out." Furthermore, the attachment of the one such fitting (fitting 20c as shown) is such as to permit vertical adjustment thereof along the side wall of the hopper. To this end the opening 120 in the wall through which it enters the hopper is vertically elongated, it carries a flange 121 of sufficient vertical extent to close such opening as it is moved up or down therein, and the flange is thus shiftably attached by means of set screws 122, or the like, which pass through other elongated slots therein. By means of the adjustable attachment of the fitting 20c just described, it will be seen that the "stick-out" distance from the corresponding nozzle 24a may be made the same or greater or less than the corresponding distance in the case of fitting 20.

At the same time, by reason of the adjustable attachment of the bracket 102 to the vertical plate 50 on the carriage, this being the same as in the previously described construction shown in Fig. 12, the entire hopper, with the fittings carried thereby, may be raised or lowered within limits. Accordingly, it will seen that the weld-wire "stick-out" distance for the respective nozzles 24b and 24c may be varied either conjointly or independently of each other.

For the purposes of oscillating the "stick-out" portion of the weld wires, i. e. the portions which project beyond the respective nozzles 24b and 24c, two levers 111 and 112 are employed, just as were employed in the preceding constructon for the purpose of oscillating the lower ends of the fittings that constitute the welding tools, and the same means are here shown as used for actuating such levers. However, for the purpose of connecting the outer ends of the levers with the respective weld wires W, certain changes from the previously described construction are necessary. Thus, there is provided adjacent the discharge end of the hopper, in line with the respective discharge nozzles 24b and 24c, two discs or buttons 125 and 126 of refractory ceramic, or other, material which is resistant to heat and also serves as a non-conductor of electricity, such discs having central openings, respectively, through which the end of the corresponding weld wire W is guided as it advances beyond the corresponding nozzle to the work. These discs are supported by means of rods 129 and 130, slidably and non-rotatably mounted in openings in opposite sides of the adjacent nozzle wall. One outer end of each such rod is connected with the adjacently located downwardly bent outer end of the corresponding lever 111 and 112, by removable fastenings, just as before.

Accordingly, through actuation of such levers in the manner previously described, the ends of the respective weld wires may be directly oscillated in unison, either in the same direction or reversely to each other, or the one thereof may be caused to move in a straight line along the seam while the other is oscillated.

As previously indicated in describing the construction of apparatus illustrated in Figs. 1 and 2 and subordinate sectional views, the carriage C of such apparatus is designed to be supported by a single traction belt, which is relatively narrow, compared with the overall width of the apparatus. This is likewise the case with each of the several modified constructions. Accordingly, the apparatus, when in operation, will require to be manually supported, as for example by the handle 47, provided for this purpose. In other words, when the apparatus is not being operated it will, after stopping the weld wire feed, be allowed to lie on its one side or the other. This arrangement has an advantage in that flow of flux from the hopper will naturally cease when it, as a part of the apparatus, is given a horizontal, resting position.

However, for apparatus of larger size, or for any other reason desired, the carriage may be provided with a second traction belt 40a as illustrated in Fig. 11. In such case it is merely necessary to duplicate the sprocket gear and guide plates on the opposite side of the base of the carriage, the two belts being spaced far enough apart to provide the desired degree of stability.

In connection with such travelling belt, or belts, it should also be explained that if found desirable the tread portions of the sprocket chains instead of being made of metal may take the form of rubber pads, as providing better traction as well as other advantages in the use of the apparatus.

While the general arrangement of circuits in a welding system employing the present improved method and apparatus has been hereinbefore described, such system being schematically laid out in Fig. 18, certain features remain to be set forth, and particularly the manner in which the travel motor 31 is connected in such system.

Referring to such Fig. 18, which shows the various switches and other movable parts of the system in positions occupied when welding, the leads for such motor 31, whereby the carriage C is propelled, together with leads which form part of the relay circuit that controls the electrode feed, and thus the arc, are carried in a flexible, insulated cable 130 (see also Fig. 1), one end of which is attached to the carriage C, the other at a suitable point on the stationary part of the apparatus. Actually, three leads suffice for the indicated purpose, viz. a common return 131, lead 132 for the dynamic brake relay circuit, which will be presently described, and lead 133 for the travel motor 31. The switch 134, which controls such dynamic brake circuit, and the switch 135, which controls the travel motor circuit, are simultaneously operable by means of a button or lever 136 on the carriage. There is also included in one of leads 133 of such travel motor circuit a rehostat 137, diagrammatically shown in Fig. 18. This is likewise conveniently mounted on carriage C adjacent motor 31 and is controlled by means of a rotatable knob 138 (see Fig. 1).

While operation of the electrode feed motor 3 may, as previously described, be tied in with the welding operation by current relay 10, which closes switch 11 in one of the armature leads of said motor whenever welding current is flowing, this mode of control is utilized only when the welding tool is being used manually, i. e. apart from the tractor carriage C. In such case the flow of welding current is started by simply touching the end of the electrode or weld wire which projects beyond such tool with the work-piece, and to stop the welding operation it is merely required to withdraw the tool sufficiently rapidy to break the arc, whereupon the electrode feed motor automatically stops. However, this method of controlling the electrode or weld wire feed is not practicable, or at least convenient, when the tool is mounted on a carriage; accordingly the following additional means for controlling the electrode feed are provided.

As shown on Fig. 18, the current relay operated switch 11 may be by-passed by closing a switch 139 in a parallel portion 12a of feed motor armature lead 12, such last-mentioned switch being interconnected with a second switch 140 in a parallel branch 132a of relay circuit 132 in such manner that when one switch is opened the other will be closed. It will thus be seen that the relay circuit in question may be closed either through this switch 140, or previously mentioned switch 134, which is actuated conjointly with travel motor control switch 135 through button 136 on the carriage. The relay 141, which is controlled by the circuit 132, serves simultaneously to operate a switch 142 in armature lead 12 of the electrode feed motor and a switch 143 which is adapted to short-circuit the motor armature. While the welding operation is continuing, such first-mentioned switch 142 will be closed and such last-mentioned switch 143 held open by the relay 141, but upon opening switch 134 the positions of these switches are reversed, with the result that not only is flow of current through electrode feed motor 3 interrupted, but such motor is dynamically braked.

From the foregoing it will follow that when the welding tool is mounted for operation on carriage C the switch 139 should be closed. Thereupon, by turning the control lever 136 on the carriage to its "on" position, the travel motor switch 135 and electrode feed motor switch 142 will be simultaneously closed, so that the carriage will start to move along the seam to be welded and the electrode or weld rod will be simultaneously fed to the work and an arc be struck and maintained as the welding operation proceeds. When it is desired to interrupt the latter, by turning the lever 136 on the carriage to "off" position, the travel motor switch 135 is opened and simultaneously therewith the relay circuit 132 is interrupted by the opening of switch 134 so that the electrode feed motor will be stopped and dynamically braked.

It will thus be seen that the operator has available, on the carriage, means not only for controlling the starting and stopping of the welding operation, this being effected by starting or stopping the feed of the weld rod or wire, but also for controlling the starting and stopping of the carriage travel, this being effected simultaneously with the foregoing. At the same time the speed of travel of the carriage may be varied by adusting the rheostat through the control knob 138.

The advantage obtained by dynamically braking the wire feed motor in the manner just described, is that a more uniform stopping condition is obtained than by just shutting off the motor with possible over-running. On the other hand, the travel motor is permitted to coast to a stop, with the result that the end of the electrode or weld wire will be dragged a short distance through the deposited layer of flux, thus instantly extinguishing the arc.

For each amplitude of oscillation there appears to be a maximum travel speed beyond which the bead will not fill out properly or will tend to leave an undercut along the edge. The following table shows this relation as determined with an electrode on negative polarity where such electrode, i. e. wire, is of 5/64 inch diameter and is made of silicon killed steel having 0.048% sulphur content, viz.:

| Oscillation Amplitude, In. | Maximum Travel Speed, In. Min. | Actual Current Used in Test, Amp. | Actual Voltage |
|---|---|---|---|
| 0 | 160 | 500 | 33 |
| 5/32 | 108 | 500 | 33 |
| 1/4 | 82 | 650 | 35 |
| 3/8 | 57 | 650 | 35 |
| 9/16 | 28 | 650 | 35 |
| 3/4 | 13 | 650 | 35 |

Figure 19:
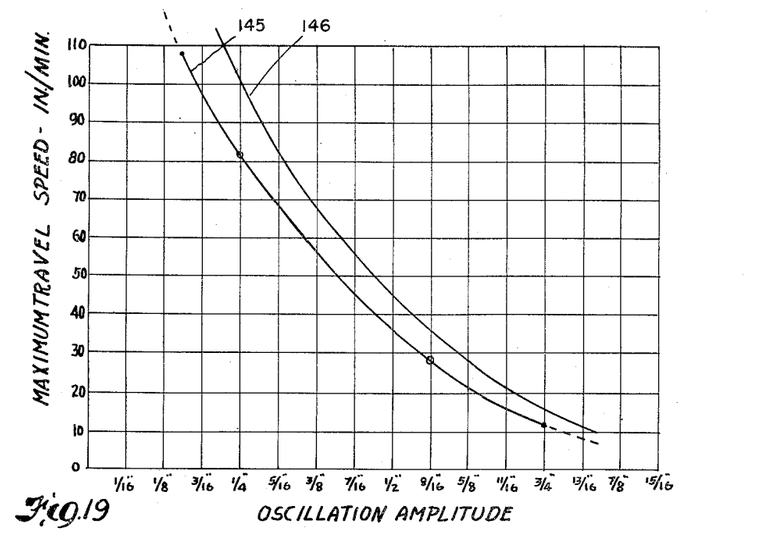
Figs. 19 and 19a are charts, the first of which shows preferred relation between oscillation amplitude and travel speed while the second shows usable range of oscillation frequencies.

The foregoing data are shown in graph form in Fig. 19, whereon curved line 145 indicates the relation between travel speed and oscillation amplitude in the case of the silicon killed steel weld wire and line 146 the similar relation in the case of wire made of rimmed steel. It has been found that using an electrode on negative polarity allows a somewhat higher travel speed than where the electrode is positive, and it has also been found that where the electrode is made of rimmed steel travel speeds of from 20 to 25% higher can be utilized than with such silicon killed steel. As is known, an electrode of negative polarity tends to pile up a higher bead than a positive electrode.

The minimum allowable frequency of oscillation is dependent upon the speed of travel; in general the number of oscillations per unit of distance traversed along the line of weld should be approximately equal to such unit divided by the electrode diameter. At least the foregoing is a condition where a weld seam having a continuous, even bead is desired, e. g. one without wavy or scalloped edges. Another consideration, of equal if not greater importance, is that the actual distance traveled by the end of the electrode is made up of the distance traveled along the seam plus that of its oscillatory movement. The latter, of course, will vary with the amplitude of oscillation, and as this is increased the travel speed along the seam requires to be corespondingly decreased. Furthermore, decreasing such travel speed will allow a higher frequency of oscillation for a given amplitude. However, a practical limit is imposed on frequency of oscillation and corresponding speed of transverse movement, in that if too rapid the flux and molten slag begin to be thrown beyond the bead margins.

Figure 19A:
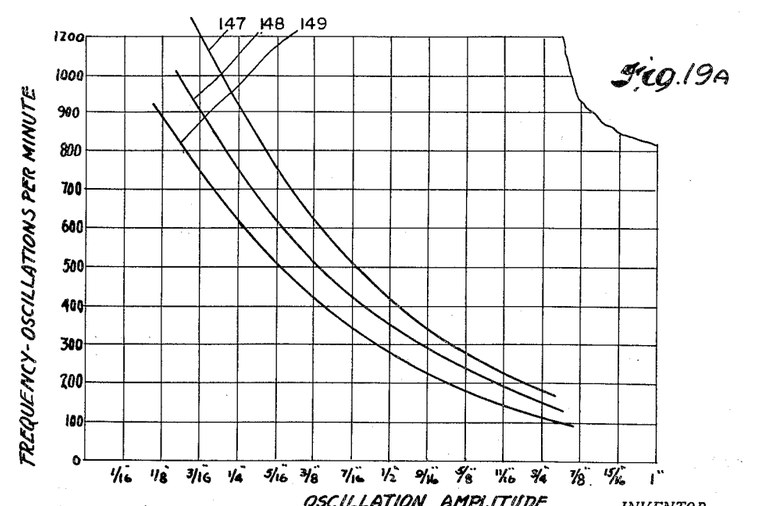

The second chart, Fig. 19a, graphically shows the results of some illustrative frequency determinations. On such chart the curved line 148 indicates the relationship of oscillation frequency and corresponding amplitude which has been found satisfactory for maximum oscillation frequency at maximum travel speed; while curved line 149 similarly shows such relationship for minimum frequency of oscillation at such maximum travel speed; and line 147 shows such relationship for maximum frequency of oscillation at one-half such maximum travel speed.

The difference in the character of the weld obtained in high speed arc welding where the end of the electrode is thus oscillated transversely of its direction of travel, instead of simply traveling along the line to be welded, is illustratively shown in Figs. 20 to 26 inclusive.

Figure 20:
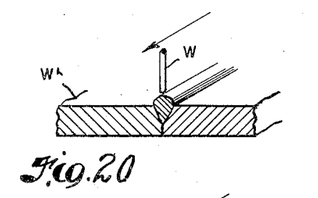
Fig. 20 is a cross-section and perspective view showing the type of bead normally produced by the aforesaid patented method of high speed arc welding.

In the first of these figures the electrode or weld wire W is assumed to be moving along the line to be welded without being oscillated transversely of such line, the current values and other conditions being substantially as set forth in the table above. The resulting weld will be relatively deep and tend to be constricted in its lower portion, where the abutting edges of the plates which compose the work-piece W' are square cut as will ordinarily be the case. The bead will likewise be narrow with sharply defined margins, and as previously noted, may under certain conditions show a tendency towards undercutting.

Figure 21:
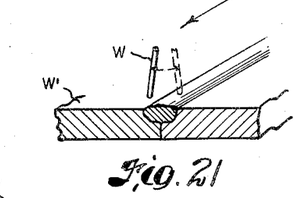
Figs. 21 and 21a are views similar to Fig. 20 showing two of the distinctive forms of weld joint obtainable by the present improved method.
Figures 21A, 23:
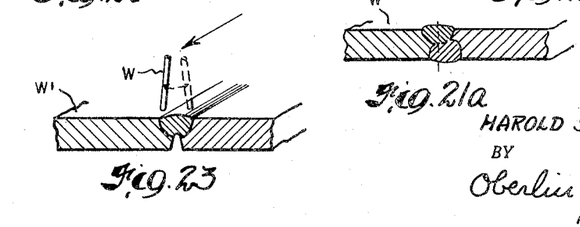
Fig. 23 is a view, similar to that of Fig. 21, but showing the type of weld joint obtainable when the edges of the work-piece are spaced apart a substantial distance.
Figure 22:
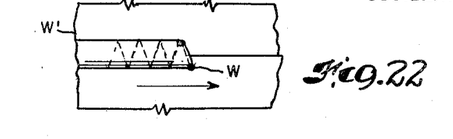
Fig. 22 is a diagrammatic plan view showing the relation of the travel speed and arc oscillation frequencies in the production of such improved form of bead by means of the present apparatus and process.

In contradistinction, where the electrode is transversely oscillated, in the manner hereinbefore described, a seam of the cross-sectional form indicated in Fig. 21 will be produced, such seam being characterized by less penetration, the inclusion of a broader area of interfusion, and a comparatively flat bead. A particular advantage is obtained, where a seam is welded from opposite sides. Whereas it is necessary quite accurately to oppose two seams of the character shown in Fig. 20, when the welded areas are of the cross-sectional form shown in Fig. 21, they may be relatively displaced as illustrated in Fig. 21a, and still provide a satisfactory weld.

An entirely satisfactory seam of this general character may also be formed even where the edges of the work-pieces to be welded are not closely adjacent. Thus, as indicated in Fig. 23, a considerable gap between such edges may be bridged over by allowing the flux to fill the seam and then traversing the joint with a transversely oscillatory arc as described.

The plan view (Fig. 22) indicates generally the relationship which should be maintained between the rate of travel longitudinally of the seam and the rate of transverse oscillation. In other words, as there shown, as the electrode or weld wire reaches the limit of successive oscillations it should be advanced in a longitudinal direction a distance only slightly greater than its diameter, in order to insure the formation of a homogeneous seam and a bead with smooth lateral edges. The amplitude of oscillation will be controlled by the factors hereinbefore pointed out, and the frequency of oscillation will be limited, among other things, by the tendency of the rapidly oscillating electrode or weld wire to throw molten metal beyond the edge of the desired bead. It will also be understood that the under portion of the layer of flux which is deposited from the hopper simultaneously with the progress of the welding operation is reduced to molten state and the rate as well as amplitude of oscillation should not be such as to unduly disturb such flux layer, and particularly such molten portion thereof.

Fig. 24 diagrammatically illustrates the progress of the welding operation where the electrode or weld wire is oscillated in a circular path. Substantially the same conditions as to frequency and amplitude of oscillation will apply here as in the case of the transverse oscillation. However it has been observed that in the case of circular oscillation the action of the arc tends to pile up the weld metal more on one side of the seam than the other, an effect which may be desirably utilized in welding a lap joint or a fillet joint. Thus, as illustrated in Fig. 25, the tendency of the welding metal to fall away from a vertical surface may not only be overcome, but the seam elevated along such surface.

Finally, a illustrative form of seam which may be attained by the use of plural arcs, one of which travels in a straight line while the other is transversely oscillated, is shown in Fig. 26. In such case the same as initially formed by the straight travelling arc will be substantially as shown in Fig. 20, but while still molten, the oscillatory arc which immediately follows will broaden the upper portion of the seam and flatten out the bead, substantially as shown in Fig. 21. In connection with such use of plural arcs it should be further observed that further variety in the character of the seam produced may be obtained by imposing currents of different density on the successive electrodes or weldrods, with corresponding variation in the degree of penetration obtained with each. As already explained, the number of electrodes or weld wires employed in such tandem operation is not limited to two, as illustrated in Figs. 12 and 15. Obviously the variety of results obtainable will be increased by the use of three or more electrodes thus arranged in tandem and each capable of being individually oscillated or otherwise manipulated.

In each of the several modified forms of apparatus described above, the welding tool, including the associated flux hopper, is removable from the carriage and thus available for hand welding whenever this is found desirable. In other words, in welding together an assembly of parts, particularly in the case of large structures, there are numerous places to be welded where hand manipulation is the more convenient, indeed the only practicable, procedure, as well as longer stretches of seam to be welded where automatic operation is preferable, not only because of the saving in time but also the uniformity in result thus obtainable. The present apparatus it will be seen lends itself readily to use in either of the foregoing ways. In other words, it is adapted to meet a much greater variety of situations than any arc welding instrumentality heretofore available.

The term "tool" as used herein will be understood to connote any form of terminal fitting through which a weld wire may be fed to the work-piece. It consists in effect of the discharge end of the tubular guide through which the wire is thus fed and is not limited to the particular form of fitting shown herein, such form being specially designed for use with an associated flux hopper.

Similarly it will be understood that the term "transverse" as applied to the oscillatory movement of the electrode, whether such movement be produced directly or by oscillation of such tool, or of the tool with associated hopper, is intended to include movement in any path that intersects the general line of travel along the seam to be welded. Thus, as illustrated, such transverse oscillation will include both straight line and circular movements of the electrode end. Furthermore, such oscillatory movement need not be symmetrical with respect to such line of travel, but may extend further to one side than the other thereof in order to extend or build up the seam more to one side than the other. By oscillatory is meant one complete movement or cycle of the electrode, for example from the extreme position on one side to the opposite side of its movement and return.

In case the flux used in the welding operation should have a tendency to pack in the lower portion of the conical hopper to the extent that it might interfere with the independent oscillation of the nozzles 24 and 24a as described in connection with Fig. 12, or of the weld wires W as described in connection with Fig. 15, the flux may be fed to the seam either in advance or from one side, or it may be supplied in freely falling condition as disclosed in U. S. Patent No. 2,402,938 to L. K. Stringham, dated June 25, 1946.

While the present invention has been described as specifically adapted for the carrying out of so-called high-speed arc welding, it will be understood that the improvements, both in process and apparatus, may be used to advantage in other arc welding systems.

Other modes of applying the principle of my invention may be employed instead of the one explained, change being made as regards the means and the steps herein disclosed, provided those stated by any of the following claims or their equivalent be employed.

I therefore particularly point out and distinctly claim as my invention:

1. In arc welding apparatus, wherein a metallic electrode in the form of a wire is fed continuously to the work, the combination of a relatively stationary wire-feeding mechanism and a remotely located relatively portable welding head, a flexible tube for guiding such electrode as it is fed from such mechanism, said welding head including a welding tool attached to the free end of said tube, a flux hopper associated with said tool, and a work-engaging carriage whereon said tool and hopper are mounted, said hopper having a discharge opening arranged to deposit a layer of flux in the path of travel of said tool and such mounting permitting conjoint oscillatory movement of said tool and hopper transversely of such path, and means on said carriage adapted thus to oscillate said tool and hopper incidentally to movement of said carriage on the work, said tool and hopper being also adapted when detached from said carriage for use in manual welding independently of said carriage.

2. In arc welding apparatus, wherein a metallic electrode in the form of a wire is fed continuously to the work, the combination of a relatively stationary wire-feeding mechanism and a remotely located relatively portable welding head, a flexible tube for guiding such electrode as it is fed from such mechanism, said welding head including a welding tool attached to the free end of said tube, a flux hopper associated with said tool, and a work-engaging carriage whereon said tool and hopper are mounted, said hopper having a discharge opening arranged to deposit a layer of flux in the path of travel of said tool and such mounting permitting conjoint oscillatory movement of said tool and hopper transversely of such path, and a motor on said carriage for propelling the same and thus oscillating said tool and hopper at predetermined relative rates, said tool and hopper being also adapted when detached from said carriage for use in manual welding independently of said carriage.

3. In a method of arc welding wherein an arc is established between a metal work-piece and the end of a metallic electrode, the steps which comprise feeding such electrode toward such work-piece while moving the end thereof relatively to the latter so as to traverse the line to be welded, and simultaneously oscillating such electrode end transversely of such line, the number of oscillations per unit of distance traversed being approximately equal to such unit divided by the electrode diameter.

4. In a method of arc welding wherein an arc is established between a metal work-piece and the end of a metallic electrode, the steps which comprise feeding such electrode to such work-piece, imposing on the terminal portion of such electrode, when the end thereof contacts such work-piece, an arc welding current of sufficiently high density to raise such end substantially instantaneously to the melting point by resistance heating alone, whereby such contact is broken and an arc is established between such end and work-piece, continuing to feed such electrode while maintaining such current at correspondingly high density, moving such electrode end along the line to be welded, and reducing the depth of penetration of the resulting weld by oscillating said electrode end transversely of such line, the number of oscillations per unit of distance travelled being approximately equal to such unit divided by the electrode diameter.

5. In a method of arc welding wherein an arc is established between a metal work-piece and the end of a metallic electrode, the steps which comprise feeding such electrode to such work-piece, imposing on the terminal portion of such electrode, when the end thereof contacts such work-piece, an arc welding current of sufficiently high density to raise such end substantially instantaneously to the melting point by resistance heating alone, whereby such contact is broken and an arc is established between such end and work-piece, continuing to feed such electrode while maintaining such current at correspondingly high density, moving such electrode end along the line to be welded, and controlling the depth of penetration of the resulting weld by oscillating said electrode end transversely of such line at a predetermined rate relatively to the rate of travel therealong, the number of oscillations per unit of distance travelled being approximately equal to such unit divided by the electrode diameter.

6. In arc welding apparatus, wherein a metallic electrode in the form of a wire is fed continuously to the work, the combination of a flexible tube for guiding such electrode, a welding tool attached to the free end of said tube, a flux hopper associated with said tool, a self-propelled carriage whereon said tool and hopper are mounted, said hopper having a discharge opening arranged to deposit a layer of flux in the path of travel of said tool and such mounting permitting conjoint swinging of said tool and hopper about a vertical axis as well as conjoint oscillatory movement of said tool and hopper transversely of such path, and a means on said carriage for propelling the same and oscillating said tool and hopper at predetermined relative rates.

7. In arc welding apparatus, wherein a metallic electrode in the form of a wire is fed continuously to the work, the combination of relatively stationary wire feeding mechanism, a flexible tube for guiding such electrode as it is fed from such mechanism, a welding tool attached to the free end of said tube, a work-engaging, self-propelled carriage whereon said tool is mounted, the work-engaging member of said carriage being in the form of an endless belt aligned with the intended direction of travel of said carriage, and adjustable means adapted to conform the tread portion of said belt to a plane, convex and concave surface, as desired.

8. In arc welding apparatus, wherein a metallic electrode in the form of a wire is fed continuously to the work, the combination of relatively stationary wire feeding mechanism, a flexible tube for guiding such electrode as it is fed from such mechanism, a welding tool attached to the free end of said tube, a work-engaging, self-propelled carriage whereon said tool is detachably mounted, and a steering handle for said carriage rigidly connected to and rising vertically thereabove.

9. In arc welding apparatus wherein a metallic electrode in the form of a wire is fed continuously to the work, the combination of a relatively portable welding head and a remotely located relatively stationary wire feeding mechanism, said head including a work-engaging carriage and a welding tool mounted thereon for free rotative movement about an axis disposed at an angle to the path of travel of said carriage, and a flexible tube for guiding such electrode from said feeding mechanism to said tool.

10. In arc welding apparatus wherein a metallic electrode in the form of a wire is fed continuously to the work, the combination of a relatively portable welding head and a remotely located relatively stationary wire feeding mechanism, said head including a work-engaging carriage and a welding tool mounted thereon for free rotative movement about an axis disposed at an angle to the path of travel of said carriage, said welding tool being also mounted for oscillatory movement transversely of such path, and a flexible tube for guiding such electrode from said feeding mechanism to said tool.

11. In arc welding apparatus wherein a metallic electrode in the form of a wire is fed continuously to the work, the combination of a relatively portable welding head and a remotely located relatively stationary wire feeding mechanism, said head including a work-engaging carriage and a welding tool mounted thereon for free rotative movement about an axis disposed at an angle to the path of travel of said carriage, such mounting permitting oscillatory movement of said tool transversely of such path, means on said carriage adapted to oscillate said tool incidentally to travel of said carriage, and a flexible tube for guiding such electrode from said feeding mechanism to said tool.

12. In electric arc welding apparatus wherein a metallic electrode in the form of a wire is fed continuously to the work during a welding operation, the combination of a self-propelled carriage, a welding tool mounted on said carriage for movement along a weld seam with said carriage, wire feeding mechanism for advancing an electrode from said tool toward the work, and means for braking said wire feeding mechanism in combination with means for continuing the movement of said self propelled carriage at least for a short distance whenever the electric arc is interrupted whereby the electrode end is removed from the molten weld pool.

13. In arc welding apparatus wherein a metallic electrode in the form of a wire is fed continuously to the work, the combination of a self-propelled carriage movable along a line of a weld, a welding tool mounted on said carriage, wire feeding mechanism and a flexible tube between said mechanism and said tool for guiding the electrode from the mechanism to the tool, a flux hopper associated with said tool and having a discharge opening arranged to deposit a layer of flux in the path of travel of said tool, said tool and hopper being mounted on said carriage for conjoint oscillatory movement of said tool and hopper transversely of the weld line, and means on said carriage adapted to oscillate said tool and hopper incidentally to movement of the carriage along the weld line with the number of oscillations per unit of distance traveled approximately equal to the unit divided by the electrode diameter.

14. Electric arc welding apparatus comprising in combination, means for feeding a pair of electrodes toward a workpiece to be welded with the electrodes in side by side spaced relationship, means for simultaneously advancing such electrodes sidewardly in generally tandem relationship along a desired line of weld, thus providing a leading and trailing electrode, and means for repetitively moving the trailing electrode in a direction transverse to the line of the weld while holding the leading electrode fixed in such transverse direction.

15. Electric arc welding apparatus comprising in combination means for feeding a plurality of electrodes in side by side spaced relationship towards a workpiece to be welded, means for simultaneously advancing such electrodes sidewardly in generally tandem relationship along a desired line of weld, thus providing leading and trailing electrodes and means for repetitively moving at least one of said electrodes in a direction transverse to the line of the weld bead while holding another fixed in such transverse direction.

16. The combination of claim 15 wherein means are provided for independently electrically energizing each of said electrodes with a different weld current.

17. The combination of claim 15 wherein fixed means are provided for electrically energizing said electrodes a distance at least in excess of three inches from said workpiece, and the means for moving the electrode in said transverse direction engage said electrode between the means for energizing the electrode and the arcing end of the electrode.

18. Electric arc welding apparatus comprising in combination, a welding head, means on said head for feeding a plurality of electrodes in side by side spaced relationship toward a workpiece to be welded, means for advancing said welding head in a desired line of weld with said electrodes in generally tandem relationship, means on said welding head for electrically energizing said electrodes spaced a distance at least greater than three inches from the arc end of the electrode and fixed in a direction transverse to said line of weld, and means engaging the electrodes between the point of energization of said electrodes and the arcing end of said electrodes for moving at least one of the arcing ends of the electrodes in a repetitive manner in a direction transverse to the line of the weld bead while the point of energization remains relatively fixed in such transverse direction.

19. The combination of claim 18 wherein said apparatus also includes a power source adjusted to deliver a welding current to each electrode in relation to the cross-sectional area thereof, such that the arcing end of each electrode will be heated to a temperature in excess of 1500° F. independently of the heat of the arc by virtue of the high density currents flowing through the stickout portion of the electrode.

References Cited in the file of this patent

UNITED STATES PATENTS

| Number | Name | Date |
|---|---|---|
| 1,508,711 | Noble | Sept. 16, 1924 |
| 1,508,746 | Clarkson | Sept. 16, 1924 |
| 1,580,020 | Cutler et al. | Apr. 6, 1926 |
| 1,667,585 | Chapman | Apr. 24, 1928 |
| 1,933,340 | Raymond | Oct. 31, 1933 |
| 2,024,965 | Chapman | Dec. 17, 1935 |
| 2,025,785 | Southgate | Dec. 31, 1935 |
| 2,163,657 | Beckman | June 27, 1939 |
| 2,340,796 | Chyle | Feb. 1, 1944 |
| 2,398,355 | Bristol | Apr. 16, 1946 |
| 2,402,938 | Stringham | June 25, 1946 |
| 2,423,190 | Kennedy | July 1, 1947 |
| 2,444,834 | Landis et al. | July 6, 1948 |
| 2,469,790 | Schmerber | May 10, 1949 |
| 2,472,803 | Beyer et al. | June 14, 1949 |
| 2,478,525 | Cutrer | Aug. 9, 1949 |
| 2,510,204 | Baird | June 6, 1950 |
| 2,536,294 | Landis et al. | Jan. 2, 1951 |

OTHER REFERENCES

Scientific American, May 1945, p. 298, "Improved Welding."